Aug. 31, 1948.                D. S. ROBBINS                2,448,463
                        METHOD OF MAKING BRAIDED SLINGS
Filed May 5, 1945                                        3 Sheets-Sheet 1

INVENTOR
David S. Robbins
BY John E. Jackson
ATTORNEY

Aug. 31, 1948. D. S. ROBBINS 2,448,463
METHOD OF MAKING BRAIDED SLINGS
Filed May 5, 1945 3 Sheets-Sheet 2

INVENTOR
David S. Robbins
BY John E. Jackson
ATTORNEY

Aug. 31, 1948.　　　　D. S. ROBBINS　　　　2,448,463
METHOD OF MAKING BRAIDED SLINGS

Filed May 5, 1945　　　　　　　　　　　　3 Sheets-Sheet 3

INVENTOR
David S. Robbins
BY John E. Jackson
ATTORNEY

Patented Aug. 31, 1948

2,448,463

UNITED STATES PATENT OFFICE 2,448,463

METHOD OF MAKING BRAIDED SLINGS

David S. Robbins, Hamden, Conn., assignor to The American Steel and Wire Company of New Jersey, a corporation of New Jersey Application May 5, 1945, Serial No. 592,241

6 Claims. (Cl. 87—8)

This invention relates to a braided sling and method of making the same and particularly to such slings made of an equal number of left and right lay ropes.

Rope slings have been made in various ways and are of two main types, those having a single leg and those having two or more legs. It is desirable to have the slings flexible and to obtain the maximum strength from the ropes used in making the slings. It is also desirable that the slings should lay dead.

It is therefore an object of my invention to provide slings having these desired characteristics.

Another object is to provide a method of making the slings.

These and other objects will be apparent after referring to the following specification and attached drawings, in which.

Figure 1:
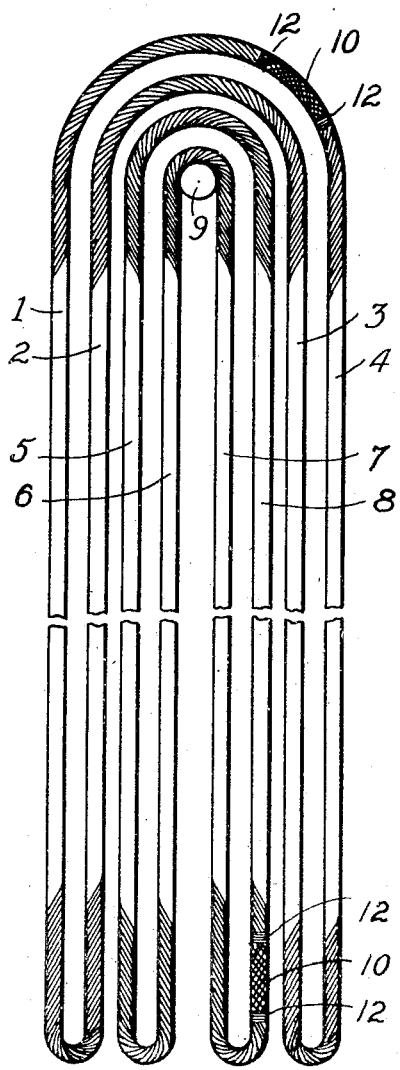
Figure 1 is a diagrammatic view illustrating the positions of the ropes prior to braiding an eight-part braided sling from two ropes.

Figures 1 to 4 disclose one embodiment of my invention in which a sling is made from two endless units, one of the units being made of left lay rope and the other of right lay rope. In the completed sling the right lay and left lay components neutralize or compensate each other so that the sling will be dead even though the individual ropes are not preformed. In making the sling, the ropes are doubled on each other and arranged into a substantial U- or V-shape as shown in Figure 1 with each leg of the V having two substantially parallel parts of left lay rope as indicated by reference numerals 1, 2, 3, 4, and two substantially parallel parts of right lay rope as indicated by reference numerals 5, 6, 7 and 8. A pin 9 may be provided at the apex of the V to hold the ropes while braiding, but a thimble makes a better loop than the pin and will be used in most instances. During braiding, the thimble is securely held in the splicer's vice. It will be understood that the showing in Figure 1 is merely schematic and that the ropes will all bear against the pin 9. As shown in Figure 1, the ropes are double spliced at 10 with tie bands being applied at 12 to prevent unraveling. Before braiding of the sling is started, each pair of the rope components is marked in some manner, such as by a piece of chalk so that the operators in braiding the sling can identify the ropes. This enables them to maintain a certain specific lay in the braided structure. If this is not done, then it is possible that some lays may be braided looser or tighter than others, with the result that in actual service, all of the components of the sling may not be subjected to the same stress. In other words, some components may be longer than others and these longer components may then be subjected to a greater stress than the shorter components. Two operators now perform the braiding operation, the one operator taking ropes 1 and 2 in his left hand and ropes 7 and 8 in his right, while the other operator takes ropes 5 and 6 in his left hand and 3 and 4 in his right. In the braiding operation, operator No. 1 passes his loops back and forth in a horizontal plane keeping ropes 1 and 2 on top of 7 and 8 for each reversal, while operator No. 2 passes his loops back and forth in a vertical plane keeping ropes 5 and 6 to the left of 3 and 4 for every reversal. This procedure may be reversed, the only requirement being that each operator have the left lay ropes of one leg in one hand and the right lay ropes of the other leg in the other while during the braiding operation the same ropes must be on the same side for each reversal. In the braiding operation, the ropes of each pair are kept substantially parallel to each other. The braiding is started a sufficient distance from pin 9 to insure that an eye of the desired size will be formed. The braiding is continued until enough rope remains to enable a thimble to be inserted or a loop formed at the free end of the ropes. This forms a sling having a plurality of double short spliced endless units with the entire length of the splices being positioned substantially in the eyes. Instead of a double splice, a single splice may be used. While the splices are shown made before the braiding operation is started, it is preferable to make them after the sling is completely braided to make sure that the length of the ropes are exactly alike and that any twist in the rope is run out. Before inserting a thimble into the eye, the ropes are arranged substantially parallel and are served together preferably by means of seven wire strand. After the sling with the two eyes is formed and served, a thimble 13 is inserted in the eyes 14 and strips of steel 15 are welded to the thimble to prevent it from falling out. It will be seen that the completed sling consists of a body portion 16 with an eye portion 14 at each end thereof, the body portion being formed of two pairs of substantially parallel right lay ropes and two pairs of substantially parallel left lay ropes braided together and each of the eye portions 14 being formed of two left and two right lay ropes.

Figure 2:
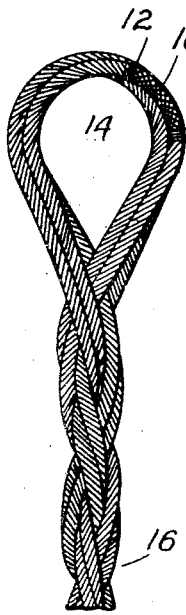
Figure 2 shows the braided sling assembled with the splice formed in the endless units.

As shown in Figure 2, one splice is in each eye but it is possible to have both splices in the same eye. For certain purposes it is desirable to use stainless steel rope and when used near great heat the sling should be coated with graphite.

Figure 3:
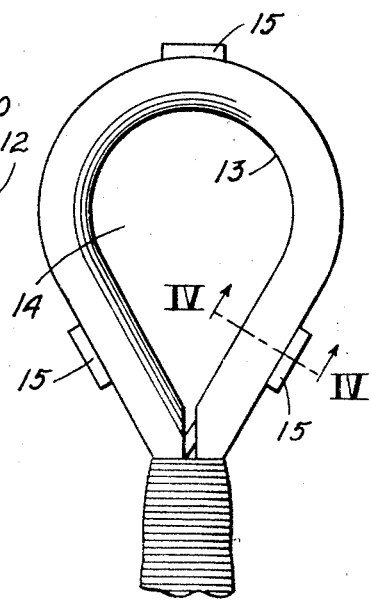
Figure 3 is a view of one of the eyes with a thimble in place.
Figure 4:
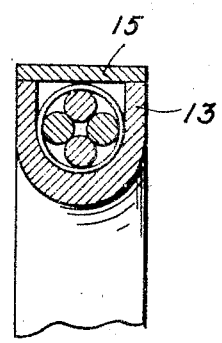
Figure 4 is a sectional view taken on the line IV—IV of Figure 3.
Figure 5:
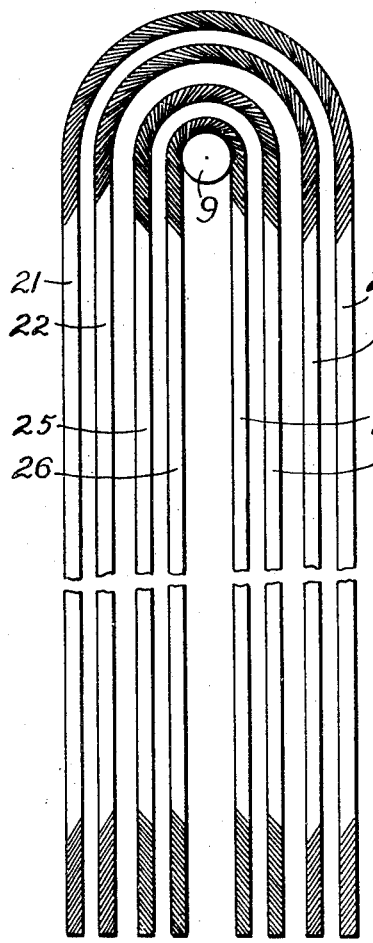
Figure 5 is a diagrammatic view illustrating the positions of the ropes prior to braiding an eight-part braided sling from two ropes.
Figure 6:
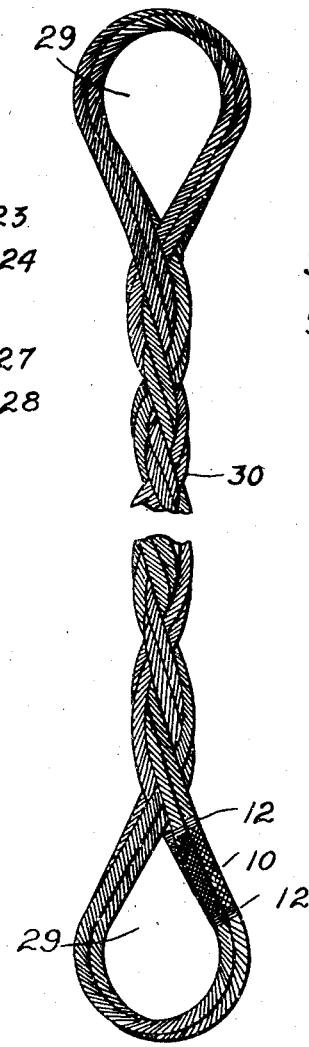
Figure 6 shows the braided sling of Figure 5 assembled with the splice formed in the endless units.

Figures 5 and 6 disclose a second modification of my invention which is quite similar to that shown in Figures 1 to 4. However, the eight-part braided sling comprises four endless units, two being made of right lay rope and two of left lay rope. In this embodiment the four ropes are arranged in a substantial V-shape with each leg of the V having two substantially parallel parts of left lay rope and two substantially parallel parts of right lay rope. The ropes are held in position by pin 9 in the same manner as in the first embodiment and the braiding operation is then performed in a manner similar to that of the first embodiment. One operator takes left lay ropes 21 and 22 in his left hand and right lay ropes 27 and 28 in his right hand, the other operator takes right lay ropes 25 and 26 in his left hand and left lay ropes 23 and 24 in his right hand. In the braiding operation, operator No. 1 passes his ropes back and forth in a horizontal plane, keeping ropes 21 and 22 on top of ropes 27 and 28 for every reversal or vice versa. Operator No. 2 passes his loops back in a vertical plane keeping loops 25 and 26 to the left of 23 and 24 or vice versa. This operation is continued until the braiding is completed after which the ropes are all double spliced at 10 to make endless units. While shown together, the double splices are preferably arranged around the thimble or loop in tandem in order to provide a uniform cross section of the ropes around the loop. All the splices are positioned substantially within the confines of the eye portions 29. If a thimble is used, welded strips are placed around it to hold it in place as shown in Figures 3 and 4. It will be seen that this sling is similar to that disclosed in Figure 2, the sling having two eyes 29 and a body portion 30. However, instead of two splices, there are four splices in the eyes 29.

Figure 7:
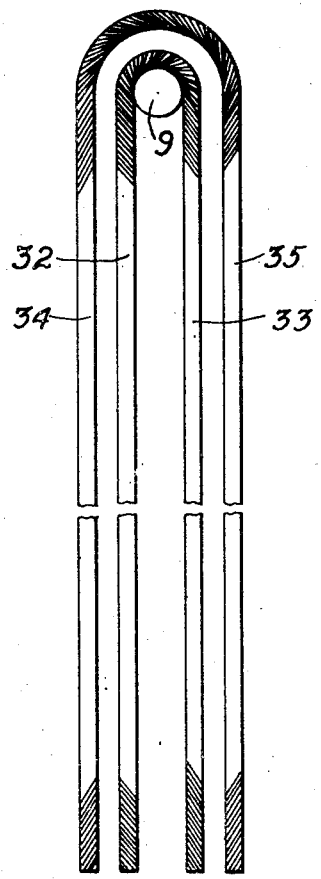
Figure 7 is a diagrammatic view illustrating the positions of the strands prior to braiding a four-part braided sling having an eye at each end.
Figure 8:
Figure 8 shows the braided sling of Figure 7 assembled with the splice formed in the endless units.

Figures 7 and 8 disclose another embodiment of my invention in which a four-part braided sling is made from one left lay rope and one right lay rope. In making this sling the ropes are arranged in a substantial V-shape around the pin 9 with each leg of the V having one right lay rope and one left lay rope. The sling is made in substantially the same manner as in the first two embodiments, that is, one operator takes right lay rope 32 in his left hand and left lay rope 35 in his right hand while the other operator takes left lay rope 34 in his left hand and right lay rope 33 in his right. In the braiding operation, operator No. 1 passes his ropes back and forth in a horizontal plane, keeping rope 32 on top of rope 35 for every reversal or vice versa, and operator No. 2 passes his loops back and forth in a vertical plane keeping rope 34 to the left of rope 33 for every reversal or vice versa. After the braiding operation is completed, the ends of the ropes are spliced together at 36 and 37 to form two endless units and an eye 38 is formed. It will be seen that this four-part sling has a body portion 39 made of two left lay ropes and two right lay ropes braided together and two eye portions 38, each of which is formed of one left lay and one right lay rope. The ropes in the eyes are served together preferably with a seven wire strand and if a thimble is desired, it is inserted in the same manner as in the other embodiments.

Figure 9:
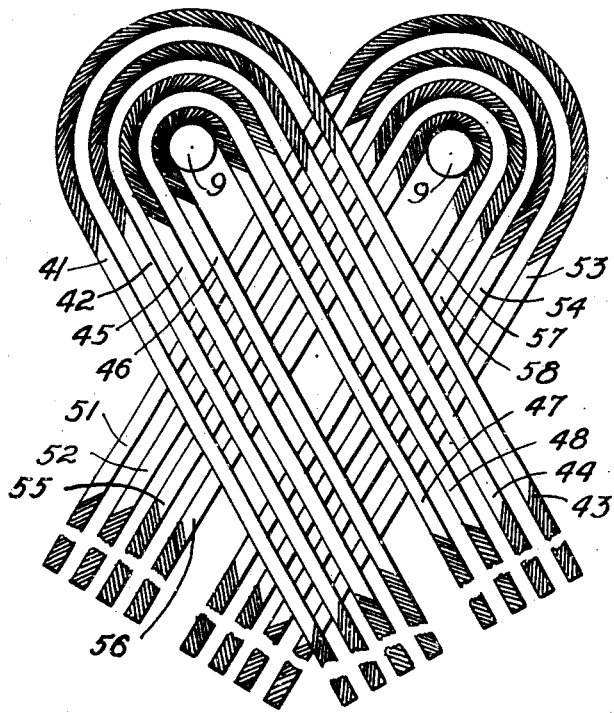
Figure 9 is a diagrammatic view illustrating the position of the strands prior to braiding a two-legged sling.
Figure 10:
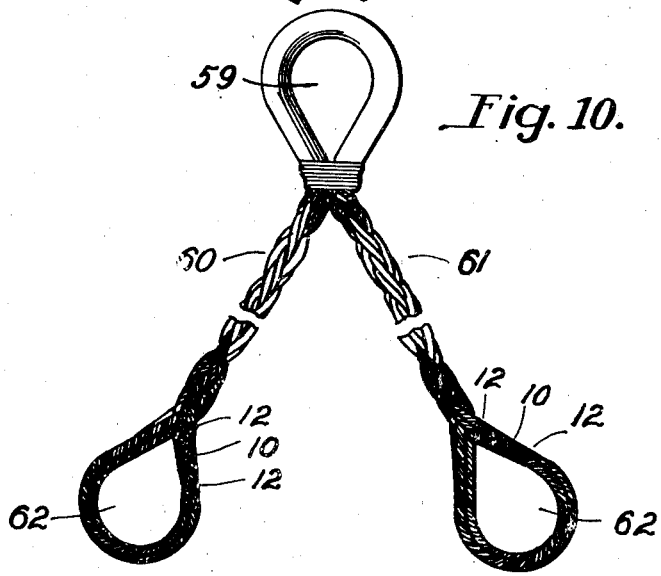
Figure 10 shows the braided sling assembled with the splice formed in the endless units.

Figures 9 and 10 disclose a two legged eight-part braided sling which is made in much the same manner as the one-legged eight-part braided sling shown in Figures 5 and 6. In this embodiment the sling is made from four right and four left lay ropes which are arranged in two groups of two right and two left lay ropes. Each group is arranged around pin 9 in a substantial V-shape as shown in Figure 9. Only one pin 9 is actually used around which all the ropes pass, but for the sake of clarity, two are shown. One operator then takes ropes 41 and 42 in his left hand and ropes 47 and 48 in his right hand, and the other operator takes ropes 45 and 46 in his left and 43 and 44 in his right hand. The ropes are braided together in the same manner as the eight-part braided sling shown in Figures 5 and 6 and the ends of the ropes are spliced together at 10. One operator then takes ropes 51 and 52 in his left hand and ropes 57 and 58 in his right hand, and the other operator takes ropes 55 and 56 in his left hand and ropes 53 and 54 in his right hand, and the ropes are braided together in the same manner as the other leg. Before the braiding operation, the eight parts of rope are laid in parallel around the pin 9, and in braiding, care is taken that both legs are braided from the same position. The eight parallel ropes around pin 9 are served with wire and a thimble is inserted in the manner shown in Figures 3 and 4. It will be seen that the completed two-legged sling consists of an eye portion 59 formed of four left and four right lay ropes and a body portion having two legs 60 and 61, each of said legs being formed of two pairs of substantially parallel right lay ropes and two pairs of substantially parallel left lay ropes braided together and an eye portion 62 at the end of each leg. Each eye portion 62 is formed of two left and two right lay ropes which are spliced and served with wire in the same manner as the ropes in Figures 5 and 6.

While several embodiments of my invention have been shown and described, it will be apparent that other adaptations and modifications may be made without departing from the scope of the following claims.

I claim:

1. The method of forming an eight-part sling from a left lay rope and a right lay rope which comprises arranging the ropes into a substantial V-shape with each leg of the V having two substantially parallel parts of left lay rope and two substantially parallel parts of right lay rope, leaving an eye at the apex of the V, gripping the ropes at the apex, braiding the pairs of ropes together with the ropes in each pair remaining substantially parallel, said braiding being maintained in one direction throughout, forming a second eye at the end of the braiding, and splicing the free ends of each rope together to form an endless unit after braiding is completed.

2. The method of forming an eight-part sling from two left lay ropes and two right lay ropes which comprises arranging the ropes into a substantial V-shape with each leg of the V having two substantially parallel parts of left lay rope and two substantially parallel parts of right lay rope, leaving an eye at the apex of the V, gripping the ropes at the apex, braiding the pairs of ropes together with the ropes in each pair remaining substantially parallel, said braiding being maintained in one direction throughout, forming a second eye at the end of the braiding, and splicing the free ends of each rope together to form an endless unit after braiding is completed.

3. The method of forming a sling from a left lay rope and a right lay rope which comprises arranging the ropes into a substantial V-shape with each leg of the V having one left lay and one right lay rope, leaving an eye at the apex of the V, gripping the ropes at the apex, braiding the ropes together, said braiding being maintained in one direction throughout, forming a second eye at the end of the braiding, and splicing the free ends of each rope together to form an endless unit after braiding is completed.

4. The method of forming a two legged sling having eight parts in each leg from four left lay and four right lay ropes which comprises arranging the ropes into two substantial V-shapes with each leg of each V having two substantially parallel parts of left lay rope and two substantially parallel parts of right lay rope, said V's having the ropes of their apices adjacent each other, forming a single eye at the apices from the ropes in each V, gripping the ropes at the apices, braiding the pairs of ropes in each V together with the ropes in each pair remaining substantially parallel, said braiding being maintained in one direction throughout, forming an eye at the end of the braiding in each leg, and splicing the free ends of each rope together to form an endless unit after braiding is completed.

5. The method of forming a sling from an equal number of left and right lay ropes which comprises arranging the ropes into a substantial V-shape with each leg of the V having an equal number of left and right lay ropes, leaving an eye at the apex of the V, gripping the ropes at the apex, braiding the ropes together, said braiding being maintained in one direction throughout, forming a second eye at the end of the braiding, and splicing the free ends of each rope together to form an endless unit after braiding is completed.

6. The method of forming a two-legged sling from an equal even number of left and right lay ropes which comprises arranging the ropes into two substantial V-shapes with each leg of each V having an equal number of left and right lay ropes, said V's having the ropes of their apices adjacent each other, forming a single eye at the apices from the ropes in each V, gripping the ropes at the apices, braiding the ropes of each V-shape together, said braiding being maintained in one direction throughout, forming an eye at the end of the braiding in each leg, and splicing the free ends of each rope together to form an endless unit after braiding is completed.

DAVID S. ROBBINS.

REFERENCES CITED

The following references are of record in the file of this patent:

UNITED STATES PATENTS

| Number | Name | Date |
|---|---|---|
| 1,475,859 | Nyman | Nov. 27, 1923 |
| 1,524,671 | Nyman et al. | Feb. 3, 1925 |
| 1,703,269 | Garris | Feb. 26, 1929 |
| 1,901,439 | Drew | Mar. 14, 1933 |
| 2,082,828 | Garris | June 8, 1937 |
| 2,142,642 | Garris | Jan. 3, 1939 |
| 2,211,478 | Pierce | Aug. 13, 1940 |
| 2,299,568 | Dickey | Oct. 20, 1942 |

FOREIGN PATENTS

| Number | Country | Date |
|---|---|---|
| 389,162 | France | Sept. 2, 1908 |